United States Patent [19]

Nichols et al.

[11] Patent Number: 4,722,942

[45] Date of Patent: Feb. 2, 1988

[54] FLEXIBLE POLYURETHANE FOAMS WHICH EXHIBIT EXCELLENT FLAME RESISTANCE

[75] Inventors: Jerram B. Nichols, Alvin; Hans R. Friedli; Stephen R. Burks, both of Lake Jackson, all of Tex.

[73] Assignee: The Dow Chemical Company, Midland, Mich.

[21] Appl. No.: 19,904

[22] Filed: Feb. 27, 1987

Related U.S. Application Data

[63] Continuation of Ser. No. 868,870, May 30, 1986, abandoned.

[51] Int. Cl.$^4$ ............................................. C08G 18/32
[52] U.S. Cl. .................................. 521/110; 252/182; 521/163; 521/167
[58] Field of Search ....................... 521/110, 163, 167; 252/182

[56] References Cited

U.S. PATENT DOCUMENTS

| | | | |
|---|---|---|---|
| Re. 30,676 | 7/1981 | Mori et al. | 521/110 |
| 3,522,304 | 7/1970 | Vogt | 528/62 |
| 3,595,814 | 7/1971 | Lloyd et al. | 521/176 |
| 3,719,639 | 3/1973 | Reetz et al. | 528/83 |
| 3,775,354 | 11/1973 | Hostettler | 521/172 |
| 3,795,638 | 3/1974 | Grogler | 521/167 |
| 3,929,730 | 12/1975 | Graefe et al. | 521/163 |
| 4,092,275 | 5/1978 | Reischl et al. | 521/163 |
| 4,113,667 | 9/1978 | Mori et al. | 521/163 |
| 4,136,241 | 1/1979 | Ammann | 521/163 |
| 4,145,318 | 3/1979 | Ohashi et al. | 521/167 |
| 4,246,361 | 1/1981 | Yukuts et al. | |
| 4,264,744 | 4/1981 | Milovanovic et al. | 521/110 |
| 4,273,882 | 6/1981 | Raynor | 521/167 |
| 4,546,121 | 10/1985 | Haas et al. | 521/164 |

Primary Examiner—Maurice J. Welsh
Attorney, Agent, or Firm—Carol J. Cavender

[57] ABSTRACT

This invention is an active hydrogen-containing composition suitable for the production of flexible polyurethane foam when reacted with a polyisocyanate, said composition comprising, (a) a polyol having an average functionality of about 2.0 to about 4.0, having at least about 50% of its active hydroxyl groups in the form of primary hydroxyl groups, and an equivalent weight from about 500 to about 5000;

(b) from about 0.5 to about 5 parts, per 100 parts by weight of component (a) of a crosslinker selected from the group consisting of monoethanolamine, diethanolamine, triethanolamine, monoisopropanolamine, diisopropanolamine, methylene bis(o-chloroaniline) and mixtures thereof; and (c) at least about 0.15 equivalent per equivalent of (a) and (b), of a polyfunctional flame retarding additive having an equivalent weight of less than about 300, which flame retarding additive is selected from the group consisting of (i) hydroxyl-terminated alkanes having a plurality of primary hydroxyl groups, (ii) alkylene ethers and polyethers having a plurality of primary hydroxyl groups, (iii) polyurea compounds having at least 2 hydroxyalkyl groups which are attached to a urea nitrogen atom, (iv) polycarbamates having a plurality of primary hydroxyl groups or a plurality of primary hydroxyalkyl groups attached to a tertiary nitrogen atoms.

Foams prepared from this active hydrogen-containing composition have excellent burn properties, as determined by tests described herein, as well as good physical properties.

36 Claims, No Drawings

FLEXIBLE POLYURETHANE FOAMS WHICH EXHIBIT EXCELLENT FLAME RESISTANCE

CROSS REFERENCE TO RELATED APPLICATION

This is a continuation of application Ser. No. 868,870 filed May 30, 1986, now abandoned.

BACKGROUND OF THE INVENTION

This invention relates to flexible polyurethane foams, more particularly to flexible polyurethane foams which exhibit excellent flame resistance in small scale burn testing.

Flexible polyurethane foams are widely used as cushioning material in, for example, furniture, automobile seating, impact-reducing media, and the like. One concern regarding the use of these foams is their performance under fire conditions, particularly their ability to resist igniting and to extinguish themselves when exposed to flame.

Many attempts have been made to reduce the flammability of polyurethane foam. The most common method is to incorporate a halogenated compound or phosphate ester flame retarding agent into the foam formulation. These agents have been somewhat successful in reducing the flammability of the foams. However, the use of these flame retarding agents has several substantial drawbacks. Although they are somewhat successful in suppressing flames, under fire conditions they decompose to form toxic gases, particularly gaseous halogen-containing compounds such as HCl and HBr. Foams containing these agents, although they resist flames, sometimes smolder during fires. In preparing the foam, the halogenated flame retarding agents often scorch the interior of the foam, which is believed to cause degradation of the foam properties. In addition, these flame retardant deactivate many of the catalysts used in the foam formulation. Moreover, many companies do not like to introduce halogenated compounds into the workplace for fear of worker exposure. In addition, relatively large quantities of these agents must be used in order to obtain satisfactory results, adding significantly to the cost of the foam.

Due to the drawbacks of the halogenated and phosphate ester flame retarding additive, it would be desirable to provide a polyurethane foam containing a flame retarding additive which does not release halogen-containing gases when burned, and which does not present the processing and exposure problems associated with the halogenated and phosphate ester agents.

SUMMARY OF THE INVENTION

This invention is in one aspect an active hydrogen-containing composition suitable for the production of flexible polyurethane foam when reacted with a polyisocyanate, said composition comprising, (a) a polyol having an average functionality of about 2.0 to about 4.0, having at least about 50% of its active hydroxyl groups in the form of primary hydroxyl groups, and an equivalent weight from about 500 to about 5000;

(b) from about 0.5 to about 5 parts, per 100 parts by weight of component (a), of a crosslinker selected from the group consisting of monoethanolamine, diethanolamine, triethanolamine, monoisopropanolamine, diisopropanolamine, methylene bis(o-chloroaniline) and mixtures thereof; and (c) at least about 0.15 equivalent, per equivalent of (a) and (b), of a polyfunctional flame retarding additive having an equivalent weight of less than about 300, which flame retarding additive is selected from the group consisting of (a) hydroxyl-terminated alkanes having a plurality of primary hydroxyl groups (b) alkylene ethers and polyethers having a plurality of primary hydroxyl groups, (c) polyurea compounds having at least 2 hydroxyalkyl groups which are attached to a urea nitrogen atom, and (d) polycarbamates having a plurality of primary hydroxyl groups, or a plurality of primary or secondary hydroxyalkyl groups attached to a tertiary nitrogen atom or atoms.

In another aspect, this invention is a flexible polyurethane foam prepared by reacting a polyisocyanate with the active hydrogen-containing composition of this invention, in the presence of a blowing agent.

The foam prepared with the active hydrogen-containing composition of this invention exhibits excellent flame resistance, as determined according to burn testing described hereinafter. Because the flame retarding additive used in this invention is not halogenated or a phosphate ester, it does not emit toxic, halogen-containing fumes when burned. The flame retarding additive used herein does not cause significant scorching of the foam and is relatively free of other processing problems which are caused by halogen compounds and phosphate esters. It also has the distinct advantage of being effective at low levels. In addition, the foam made according to this invention has generally good physical properties.

DETAILED DESCRIPTION OF THE INVENTION

The active hydrogen-containing composition of this invention comprises a relatively high equivalent weight polyol as further described herein, a certain crosslinker compound, and a flame retarding additive as described herein.

The polyol employed herein is characterized by having an average functionality of about 2 to about 4, preferably about 2 to about 3. In addition, at least about 50%, preferably at least about 70% of the reactive hydroxyl groups contained in the polyol are primary hydroxyls. The polyol has an equivalent weight from about 500 to about 5000, preferably about 1000 to about 3000, more preferably about 1000 to about 2000.

Suitable as the polyol are, for example, polyether polyols, polyester polyols, poly(alkylene carbonate)-polyols, the so-called polymer polyols, and the like. Suitable such polyols are described, for example, in columns 3–5 of U.S. Pat. No. 4,394,491 to Hoffman, incorporated herein by reference. Among the useful polymer polyols are included dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated by reference. Preferred are polyether polyols and copolymer polyols of the vinyl type, particularly styrene/acrylonitrile dispersions.

Most preferred are poly(propylene oxide)polyols having 2-3 hydroxyl groups per molecule, which are end-capped with ethylene oxide so at least about 70% of the hydroxyl groups are primary hdroxyls, and/or styrene/acrylonitrile dispersions containing about 25-55 weight percent dispersed particles in said poly(propylene oxide)polyols.

In addition to the polyol, the active hydrogen-containing composition comprises a crosslinker which is selected from the group consisting of monoethanolamine, diethanolamine, triethanolamine, monoisopropanolamine, diisopropanolamine, methylene bis(o-chloroaniline) and mixtures thereof. Of these, diethanolamine is preferred due to its relatively low toxicity and generally good performance. About 0.5 to about 5, preferably about 1 to about 3, more preferably about 1 to about 2.5, parts by weight of the crosslinker are used per 100 parts by weight of the polyol.

Also included in the active hydrogen-containing composition is a flame retarding additive. The additive is a polyfunctional compound having an equivalent weight of less than about 300, preferably less than about 200. By "polyfunctional" it is meant that the additive has at least two hydroxyl groups which are reactive with an isocyanate group. In preferred embodiments, the additive has a lower reactivity with an isocyanate group than the crosslinker. The additive is selected from the group consisting of (a) hydroxyl-terminated alkanes having a plurality of primary hydroxyl groups, (b) alkylene ethers and polyethers having a plurality of primary hydroxyl groups, (c) polyurea compounds having at least 2 hydroxyalkyl groups which are attached to a urea nitrogen atom, and (d) polycarbamate compounds having a plurality of primary hydroxyl groups, or a plurality of primary or secondary hydroxyalkyl groups attached to a tertiary nitrogen atom or atoms. Preferably, the flame retarding additive is a liquid or is miscible in the other components of the active hydrogen-containing composition.

Suitable hydroxyl-terminated alkanes include the α,ω-alkylene glycols such as ethylene glycol, 1,3-propylene glycol, 1,4-butane diol, 1,6-hexane diol, 1,8-octane diol, and the like; branched primary hydroxyl-terminated alkane diols; glycerine; trimethylolpropane and other branched primawry hydroxyl-terminated alkane triols, and the like. Preferably the hydroxyl-terminated alkane contains about 2-4, more preferably 2-3, primary hydroxyl groups. Especially preferred hydroxyl-terminated alkanes include ethylene glycol, 1,4-butane diol, and glycerine.

Suitable alkylene ethers and polyethers having a plurality of primary hydroxyl groups include diethylene glycol, triethylene glycol and the like. Also suitable are relatively low equivalent weight, polyfunctional polymers of ethylene oxide, or polymers of propylene oxide which are end-capped with ethylene oxide. Such ethers and polyethers preferably have about 2-4, more preferably about 2-3 primary hydroxyl groups per molecule.

Another suitable class of flame retarding additives are polyurea compounds having at least 2 hydroxyalkyl groups which are attached to a urea nitrogen atom. It is preferred that the compound has at least 2 primary hydroxyalkyl groups per molecule. Included in this class of additives are reaction products of a polyisocyanate and a mono- or dialkanol amine or other primary or secondary amine-containing alcohol.

Exemplary polyisocyanates from which to prepare the flame retarding additive include those listed hereinafter. Preferred are diisocyanates such as toluene diisocyanate (2,4- and/or 2,6- isomers), diphenylmethanediisocyanate (MDI, 2,4'- and/or 4,4' isomers) and its derivatives, isophorone diisocyanate, hydrogenated MDI, cyclohexane diisocyanate, p-phenylene diisocyanate and the like. In preparing a flame retarding additive from such polyisocyanates, the polyisocyanate is advantageously reacted with an excess of a mono- or dialkanolamine or other primary or secondary amine-containing alcohol to form a hydroxyalkyl-terminated polyurea. Preferred alkanolamines include ethanolamine, diethanolamine, isopropanolamine, diisopropanolamine, 2-amino-2-methylpropanol, 2-amino-2-methylol-1-butanol, and the like. In such reaction products, the hydroxyl groups may be primary or secondary, but primary hydroxyl groups are preferred. Most preferred among these compounds are adducts of toluene diisocyanate or isophorone diisocyanate with any of the alkanolamines indicated in this paragraph as being preferred. These compounds are advantageously prepared by reacting the polyisocyanate with the alkanolamine under conditions such that only the amine hydrogen reacts with the isocyanate groups. Such conditions typically include the substantial absence of a catalyst, and a relatively low temperature. Preferably, this reaction is carried out in a reactive solvent like glycerine or a high equivalent weight polyol in order to moderate the reaction so that high molecular weight species do not form, and to improve the solubility of the compound in the other components of the active hydrogen-containing composition. It will be recognized that the use of reactive solvents such as glycerine will further enhance the flame retarding properties of the foam, since glycerine itself is a flame retarding additive according to this invention.

Another class of useful flame retarding additives comprises polycarbamates having a plurality of primary hydroxyl groups, or primary or secondary hydroxylalkyl groups attached to a tertiary nitrogen atom. These flame retarding additives include the reaction products of polyisocyanates with mono, di- and trialkanolamines, α,ω-alkylene glycols and other primary hydroxyl terminated, branched or straight chain alkanes, low equivalent weight primary hydroxyl containing glycol ethers and the like. The polyisocyanates described before with respect to the polyurea flame retarding additives are suitable. As with the other flame retarding additives described herein, the carbamates have an equivalent weight of less than 300, preferably less than about 200. Preferred among these carbamates are reaction products of toluene diisocyanate, diphenylmethanediisocyanate or derivatives thereof, or isophorone diisocyanate with ethylene glycol, glycerine, diethylene glycol, triethanolamine, triisopropanolamine, methyldiethanolamine and the like.

The flame retarding agent is employed in an amount such that at least about 0.15 equivalent thereof are present per equivalent of polyol and crosslinker. Preferably, about 0.2 to about 1.5, more preferably about 0.3 to about 1.0, most preferably about 0.4 to about 1.0, equivalent of the flame retarding agent is present per equivalent of polyol and crosslinker. Such amounts generally equate to about 1 to about 15 parts by weight of the flame retarding additive per 100 parts by weight polyol, particularly about 1-6, more preferably about 1-4 parts per 100 parts by weight polyol of a lower equivalent weight additive, and 4-12, more preferably about 4-10, parts by weight of a higher equivalent weight additive.

It is normal practice in making molded polyurethane foam to premix all components of the foam except the polyisocyanate and sometimes the catalyst. Accordingly, the active hydrogen containing composition of this invention may also contain additives such as mold release agents, blowing agents, pigments and other colorants, preservatives, catalysts, antioxidants, surfactants, fillers, and the like. In making slabstock foams, the various components are normally mixed at a mixing head immediately prior to foaming. In this instance as well, these various optional additives are often useful.

Suitable blowing agents include water, low boiling halogenated alkanes, the so-called "azo" blowing agents, finely divided solids, air, nitrogen or other inert gases, and the like. Preferred are water and the low boiling halogenated alkanes. Exemplary low boiling halogenated alkanes include methylene chloride, monochloromonofluoromethane, dichloromonofluoromethane, trichloromonofluoromethane, monochlorodifluoromethane, monochlorotrifluoromethane and the like. The use of such blowing agents is well known in the art. The amount of blowing agent used is sufficient to provide a cellular structure to the foam. Preferably, the foam has a density of less than about 10, more preferably less than about 5, most preferably about 1 to about 3.5 pounds per cubic foot. To obtain such densities using only water as the blowing agent, about 0.2 to about 5, preferably about 2 to about 4.5 parts of water are advantageously used per 100 parts polyol. When halogenated alkanes are the sole blowing agent, such densities are provided using about 10 to about 50 parts of a halogenated alkane per 100 parts of polyol. A mixture of a halogenated alkane with water can also be used.

Suitable surfactants include the diverse silicone surfactants, preferably those which are block copolymers of a polysiloxane and a poly(alkylene oxide). Suitable such surfactants include L-5303, L-5305, L-520, L-540 and Y-10184 surfactants, available from Union Carbide Corporation, BF-2370, BF-2270, B-8014, B-8017, B-8200, B-8614 and BF-4813, available from Goldschmidt Chemicals, DC-190, DC-196, DC-X2-5043 and DC-1372, available from Dow Corning Corporation, and the like. Non-silicone surfactants such as poly(alkylene oxides) can also be used. Mixtures of such surfactants can also be used. The surfactant is used in an amount sufficient to stabilize the foaming reaction mixture against collapse until the foam is cured, and to promote the formation of a somewhat uniform cell structure. When present, about 0.1 to about 5, preferably about 0.2 to about 2 parts by weight of surfactant are typically employed per 100 parts of polyol.

Catalysts for preparing flexible polyurethane foams principally include organometallic catalysts and tertiary amine compounds. Suitable catalysts are described, for example, in U.S. Pat. No. 4,495,081, incorporated herein by reference. Of the organometallic compounds, organotin, organolead, organobismuth, organomercury and organoiron catalysts, especially organotin catalysts are generally preferred. Exemplary organotin catalysts include stannous octoate, dibutyltindilaurate, dibutyltindiacetate, dimethyltindilaurate and dimethyltindiacetate. Exemplary tertiary amine catalysts include triethylenediamine, bis(N,N-dimethylaminoethyl)ether, di(N,N-dimethylaminoethyl)amine, and the like. When using such catalysts, an amount sufficient to increase the rate of the various urethane-forming and foaming reactions is used. Typically, about 0.001 to about 0.5, preferably about 0.002 to about 0.1, more preferably about 0.002 to about 0.01 part of an organometallic catalyst is used per 100 parts of polyol. Tertiary amine containing compounds are used in amounts ranging from about 0.1 to about 3, preferably about 0.1 to about 1, more preferably about 0.2 to about 0.6 parts per 100 parts of polyol.

Suitable pigments and fillers include, for example, calcium carbonate, graphite, carbon black, iron oxide, titanium dioxide, alumina trihydrate and the like.

Suitable mold release agents include internal mold release agents such as described, for example, in U.S. Pat. No. 4,585,803 to Nelson et al, incorporated herein by reference.

The active hydrogen-containing composition is reacted with a polyisocyanate under conditions such that a flexible polyurethane foam is obtained. The polyisocyanate employed herein is an organic compound having an average of at least about 2.0 isocyanate groups per molecule. The isocyanate groups can be attached to aromatic or aliphatic carbon atoms. Suitable polyisocyanates are described, for example, in U.S. Pat. No. 4,065,410, 3,401,180, 3,454,606, 3,152,162, 3,492,330, 3,001,973, 3,394,164 and 3,124,605, all incorporated herein be reference.

Especially suitable aromatic polyisocyanates include 2,4- and/or 2,6-toluenediisocyanate (TDI), 2,4'- and/or 4,4'-diphenylmethanediisocyanate (MDI), p-phenylenediisocyanate, polymethylenepolyphenylpolyisocyanates, mixtures thereof and the like. Also useful are polymeric derivatives of MDI containing biuret and/or carbodiimide linkages. Other derivatives of the aforementioned polyisocyanates, including those containing isocyanurate and/or oxazolidone groups, can also be used herein. However, it is preferred to employ polyisocyanates having from about 1-4, preferably about 2-3, isocyanate groups per molecule. The toluenediisocyanate isomers are most preferred.

Useful aliphatic polyisocyanates include the hydrogenated derivatives of the foregoing aromatic polyisocyanates as well as hexamethylenediisocyanate, isophoronediisocyanate, 1,4-cyclohexanediisocyanate and the like.

Prepolymers and quasi-prepolymers of the foregoing polyisocyanates are also useful herein.

The polyisocyanate is advantageously used in an amount sufficient to provide about 0.8 to about 1.5, preferably about 0.95 to about 1.15, more preferably about 1.0 to about 1.1 isocyanate groups per active hydrogen-containing group present in the reaction mixture.

A molded polyurethane foam is advantageously prepared according to this invention by blending the polyol, crosslinker, flame retarding additive, and optional components, if any, to form an active hydrogen-containing composition. This composition is then mixed with a polyisocyanate and the mixture placed into a suitable mold. If desired, the mold can be pretreated with an external mold release agent to facilitate removal of the part from the mold. The mold is advantageously preheated to a temperature of about 80°-250° F. After placing the reactants in the mold, they are permitted to rise and cure to a desired density. After the desired curing takes place (at least enough so that the foam maintains it shape after demolding, which is advantageously about 2 minutes to about 1 hour), the molded foam is removed from the mold and post cured, if necessary.

In making slabstock foam, it is common to mix all reactants simultaneously in a mixing head immediately prior to foaming. After a short mixing period, the reaction mixture is permitted to rise against its own weight and cure. The components are advantageously at a temperature of about 60° to about 120° F. when blended, and typically, no heat is applied other than that generated from the heat of reaction. Methods for preparing molded and slabstock polyurethane foam are described, for example, in Polyurethane; Chemistry and Technology II, Technology by Saunders and Frisch, Interscience Publishers, 1964.

The resulting foam has good physical properties and excellent burn properties. For the purposes of this invention, burn properties (flame resistance) are evaluated using a vertical burn test such as described by the State of California Department of Consumer Affairs, Bureau of Home Furnishings, Technical Bulletin No. 117, *REQUIREMENTS, TEST PROCEDURE AND APPARATUS FOR TESTING THE FLAME RETARDANCE OF RESILIENT FILLING MATERIALS USED IN UPHOLSTERED FURNITURE*, January 1980 (Cal 117 test), incorporated by reference, and/or a horizontal burn test such as is described in 49 CFR 571.302, *Standard No. 302; Flammability of interior materials* (1984) (MVSS-302 test).

The following examples are provided to illustrate the invention, but are not intended to limit the scope thereof. All parts and percentages are by weight unless otherwise indicated.

EXAMPLE 1

The base formulation listed in Table 1 is used to prepare foam Sample Nos. 1–9 and Comparative Sample Nos. A–G. The flame retarding additive and the amount thereof are as indicated in Table 2 following.

TABLE 1

| | |
|---|---|
| Polyol A[1] | 50 parts by weight |
| Copolymer Polyol A[2] | 50 parts by weight |
| Water | 3.8 parts by weight |
| Diethanolamine | 1.7 parts by weight |
| Silicone surfactant[3] | 1.65 parts by weight |
| Catalyst A[4] | 0.24 parts by weight |
| Catalyst B[5] | 0.12 parts by weight |
| Catalyst C[6] | 0.075 parts by weight |
| Catalyst D[7] | 0.0042 parts by weight |
| Flame Retarding Additive | Variable |
| Toluenediisocyanate[8] | 105 index |

[1] A 1550 equivalent weight glycerine-initiated, ethylene oxide-capped poly(propylene oxide).
[2] A 25% solids copolymer polyol having dispersed in Polyol A copolymer particles prepared from a monomer mixture of 70% styrene and 30% acrylonitrile. Equivalent weight approximately 2200.
[3] Y-10184 silicone surfactant, sold by Union Carbide Corporation.
[4] bis(N,N—dimethylaminoethyl) amine.
[5] A 33 weight percent solution of triethylenediamine in dipropylene glycol.
[6] bis(N,N—dimethylaminoethyl)ether.
[7] Dimethyltindilaurate.
[8] An 80/20 by weight mixture of the 2,4- and 2,6-isomers.

In preparing the foams, all ingredients except the polyisocyanate are thoroughly blended at room temperature. The polyisocyanate is then stirred in under high agitation, again at room temperature. The blend is poured into a 15"×15"×4.5" mold, which is preheated to 150° F., and permitted to react in the closed mold for two minutes while the mold is first subjected to an external temperature of about 75° F., and then placed in a 250° F. oven for an additional 4–6 minutes. The resulting foam is removed from the mold immediately after removal from the oven.

The resulting foams are cooled and tested for tensile and tear properties using standard methods. The humid age compression set (measured after the sample is aged at 50% R.H., 220 F. for 6 hours) is determined for each foam according to standard test methods. The burn properties of each foam are measured according to the MVSS 302 test, which is a horizontal burn test, except that in some instances, the foams are tested only one day after manufacture, instead of after seven days, as is normally done. The reason for this modification is that the foams are generally more flammable shortly after curing then after a considerable aging period. Testing after only one day is therefore a more stringent test. In addition, this change reflects the trend in the industry toward more immediate foam testing. The results of the testing are reported as the average distance, in inches, of flame travel after the ignition source is removed. Low values are preferred, with 0.0 being tested. In addition, the number of samples in which the flame does not progress to a point 1.5 inches from the open end of the specimen is reported as a fraction of the number of specimens tested. For example, if all of six specimens fail to burn to 1.5 inches from the open end, the result is reported as 6/6. Values closer to one are preferred.

Tables 2 and 3 list the flame retarding additive and amount thereof, and the results of the physical testing and burn testing. As can be seen from Table 2, the use of a flame retarding additive according to this invention provides significantly improved flame resistance, as measured in the horizontal burn test, compared with the comparative samples. From Table 3, it is seen that the use of the flame retarding additive produces a foam having relatively unchanged physical properties.

TABLE 2

| Sample No. | Flame Ret. Type | Add.[1] Amount | Burn Length[2] (Inches) | 0.0 Burns[3] | Age[4] |
|---|---|---|---|---|---|
| 1 | Glycerine | 0.305 | 1.06 | 3/6 | 1 |
| 2 | Glycerine | 0.610 | 0.0 | 6/6 | 1 |
| 3 | Glycerine | 0.915 | 0.0 | 4/4 | 1 |
| | | | 0.0 | 2/2 | 7 |
| 4 | EG[5] | 0.922 | 0.0 | 6/6 | 1 |
| 5 | DEG[6] | 0.539 | 0.3 | 5/6 | 1 |
| 6 | 1,4-BDO[7] | 0.625 | 0.0 | 4/4 | 1 |
| | | | 0.0 | 4/4 | 7 |
| 7 | 1,6-HDO[8] | 0.485 | 0.0 | 6/6 | 1 |
| 8 | Gly/BDO[9] | 0.737/0.126 | 0.0 | 4/4 | 1 |
| | | | 0.0 | 2/2 | 7 |
| 9 | Gly/BDO[9] | 0.369/0.381 | 0.0 | 4/4 | 1 |
| | | | 0.0 | 2/2 | 7 |
| A* | 1,2-PG[10] | 0.501 | 3.5 | 0/4 | 1 |
| | | | 3.5 | 0/2 | 7 |
| B* | 1,2-PG | 0.752 | 2.3 | 0/4 | 1 |
| | | | 3.5 | 0/2 | 7 |
| C* | DPG[11] | 0.426 | 4.3 | 0/2 | 7 |
| D* | TPG[12] | 0.297 | 4.6 | 0/2 | 7 |
| E* | Triol[13] | 0.123 | 2.8 | 1/4 | 1 |
| | | | 0.5 | 1/2 | 7 |
| F* | Triol[14] | 0.114 | 3.6 | 0/6 | 1 |

TABLE 2-continued

| Sample No. | Flame Ret. Type | Add.[1] Amount | Burn Length[2] (Inches) | 0.0 Burns[3] | Age[4] |
|---|---|---|---|---|---|
| G* | AEEA/PO[15] | 0.414 | 4.5 | 2/6 | 1 |

Footnotes
*Not an example of this invention
[1]Flame Retarding Additive. Amount is expressed as equivalents of the additive per equivalent of polyol plus crosslinker. The water plays no part in this calculation.
[2]Length, in inches, of burning which occurs after the igniting flame is removed. Average of all samples tested.
[3]The number of samples, out of the total samples tested, which do not burn 1.5 inches from the open end.
[4]The time, in days, in which the sample is aged after foaming prior to testing.
[5]EG is ethylene glycol
[6]DEG is diethylene glycol
[7]1,4-BDO is 1,4-butanediol
[8]1,6-HDO is 1,6-hexanediol
[9]Gly/BDO is a mixture of glycerine and 1,4-butanediol
[10]1,2-PG is 1,2-propylene glycol
[11]DPG is dipropylene glycol
[12]TPG is tripropylene glycol
[13]A triol prepared by reacting a mixture of ethylene oxide and propylene oxide with glycerine. It has mostly secondary hydroxyl groups and an equivalent weight of 233.
[14]A triol made by capping glycerine with butylene oxide. It has secondary hydroxyl groups and an equivalent weight of 250.
[15]A tetrol made by adding three moles of propylene oxide to aminoethylethanolamine.

TABLE 3

| Sample No. | HACS[1] (%) | Tensile[2] Strength, psi | Tear[3] Strength, pli | Elongation (%)[2] |
|---|---|---|---|---|
| 1 | 37.0 | 18.4 | 1.31 | 100 |
| 2 | 36.9 | 21.6 | 1.15 | 88 |
| 3 | 50.0 | 24.8 | 1.20 | 116 |
| 4 | 67.4 | 22.8 | 1.31 | 97 |
| 5 | 51.2 | 19.9 | 1.25 | 101 |
| 6 | 68.0 | 21.3 | 1.51 | 137 |
| 7 | 50.4 | 19.7 | 1.25 | 92 |
| 8 | 51.0 | 24.2 | 1.24 | 118 |
| 9 | NOT DETERMINED | | | |
| A* | 64.0 | 24.4 | 1.68 | 141 |
| B* | Not determined - extreme shrinkage | | | |
| C* | 63.0 | 22.3 | 1.56 | 144 |
| D* | 57.0 | 23.9 | 1.55 | 149 |
| E* | 38.0 | 19.9 | 1.34 | 138 |
| F* | 38.9 | 24.2 | 1.24 | 118 |
| G* | 77.0 | 19.9 | 1.28 | 119 |

*Not an example of this invention
[1]HACS is Humid Age Compression Set. ASTM 3574-81 Test D.
[2]ASTM 3574-81 Test E.
[3]ASTM 3574-81 Test F.

EXAMPLE 2

Molded high resiliency flexible foam Sample Nos. 10–11 and Comparative Samples H and I are prepared in this example using the formulation described in Table 1 of Example 1. The flame retarding additive used in Sample Nos. 10–11 is the reaction product of toluenediisocyanate and 2-amino-2-methylpropanol (designated UMP), or mixtures thereof with glycerine. The amounts used are indicated in Table 4. The processing of the foams is a indicated in Example 1. Various physical and burn properties of the foams are determined and are as reported in Table 4. Burn properties are measured according to the MVSS 302 test.

TABLE 4

| Sample No. | H* | I* | 10 | 11 |
|---|---|---|---|---|
| Amount UMP[1] | 0 | 0.105 | 0.420 | 0.210 |
| Amount Glyc[2] | 0 | 0 | 0 | 0.305 |
| Density (lb/ft[3]) | 2.17 | 2.13 | NOT DETERMINED | 2.09 |
| Tensile Strength (psi)[3] | 20.9 | 25.1 | | 26.4 |
| Elongation %[3] | 90 | 113 | | 98 |
| Tear Strength (lb/in)[4] | 1.21 | 1.63 | | 1.38 |
| Resiliency, %[5] | 47 | 51 | | 53 |
| ILD[6] | | | | |
| 25% | 38 | 35 | | 42 |
| 65% | 107 | 102 | | 126 |
| Modulus[6] | 2.81 | 2.84 | | 2.97 |
| Air Flow (after crushing)[7] | 3.1 | 3.0 | | 1.5 |
| HACS[8] | 21.7 | 66.1 | 75.0 | 70.0 |
| Burn Length, In[9] | 1.86 | 3.02 | 1.42 | 0.0 |

Footnotes
*Not an example of this invention.
[1]UMP is the adduct of toluene diisocyanate and 2 moles of 2-amino-2-methyl-propanol. Amount is expressed in equivalents of UMP per equivalent of polyols and crosslinker.
[2]Glyc = glycerine. Amount is expressed in equivalents glycerine per equivalent of polyols plus crosslinker
[3]ASTM 3574-81 Test E
[4]ASTM 3574-81 Test F
[5]ASTM-3584-81 Test H
[6]ASTM 3574-81 Test B. ILD - indentation load deflection. Modulus is the ratio of 65% ILD to 25% ILD.
[7]ASTM 3574-81
[8]ASTM 3574-81 Test D
[9]MVSS test

EXAMPLE 3

Slabstock foam Sample No. 12 and comparative Sample Nos. J and K are prepared from formulations as described in Table 5.

TABLE 5

| Sample No. Component | J* | K* | 12 |
|---|---|---|---|
| | Parts By Weight | | |
| Polyol B[1] | 100 | 100 | 100 |
| Water | 2.4 | 2.4 | 2.4 |
| Freon | 12 | 12 | 12 |
| Silicone Surfactant | 1.4 | 1.4 | 1.4 |
| Catalyst B[2] | 0.15 | 0.15 | 0.15 |
| Catalyst C[2] | 0.05 | 0.05 | 0.05 |
| Catalyst E[3] | 0.25 | 0.25 | 0.20 |
| Diethanolamine | 1.4 | 1.4 | 1.4 |
| Glycerine[4] | 0 | 0 | 1.0 |
| Phosphate ester[5] | 0 | 6.0 | 0 |
| Toluene Diisocyanate[6] | | 105 index | |

*Not an example of this invention.
[1]A 50/50 blend of a 1550 equivalent weight ethylene oxide capped poly(propylene oxide) triol and a 22.5% solids dispersion of 70/30 styrene/acrolynitrile particles in the same triol.
[2]See Table 1.
[3]Dibutyltindilaurate
[4]Corresponds to 0.33 equivalent per equivalent of Polyol B and diethanolamine in Sample No. 12.
[5]Thermolin 101, a halogenated phosphate ester sold by CP Hall.

The foam samples are prepared by blending the indicated components at room temperature, and pouring them into a 15″×15″×12″ box, where the components are permitted to react at room temperature for 24 hours.

The foams are tested for various physical properties as indicated in Table 6. Burn properties are measured according to the Cal-117 test. Results of this testing are as reported in Table 6. As can be seen from these results, the burn properties of Sample No. 12 are superior to those of Comparative Sample J, in which no flame retardant is used. In Comparative Sample K, a commercially available phosphate ester flame retardant is used at six times (by weight) the amount of glycerine used in Sample No. 12. On burn testing, the burn time and char length is comparable to Sample No. 12, but the smolder weight loss is substantially greater.

TABLE 6

| Sample No. | J* | K* | 12 |
|---|---|---|---|
| Foam Properties | | | |
| Density, lb/ft[3] | 1.62 | 1.63 | 1.58 |

TABLE 6-continued

| Sample No. | J* | K* | 12 |
|---|---|---|---|
| Tensile Strength, psi[1] | 15.5 | 14.6 | 15.0 |
| Elongation, %[1] | 196 | 209 | 179 |
| Modulus[2] | 2.27 | 2.19 | 2.33 |
| Resiliency, %[3] | 56 | 50 | 55 |
| Burn Testing[4] | | | |
| After flame, sec. | 12.6 | 0.0 | 0.0 |
| Char length, in. | 5.6 | 2.9 | 2.7 |
| Smolder, % Weight Loss | 1.2 | 4.9 | 0.8 |

*Not an example of this invention
[1]ASTM 3574-81 Test E
[2]Ratio of 65% ILD to 25% ILD. ILD values measured according to ASTM 3574-81 Test B.
[3]ASTM 3574-81 Test H
[4]Cal 117 test

Comparative Example A

Since certain of the flame retarding additives of this invention, particularly glycerine, also are known to act as crosslinkers in polyurethane foam systems, it can be hypothesised that the flame resistance is due merely to increased levels of crosslinker in the foam. Accordingly, Comparative Foam Samples L and M are prepared. Comparative Sample L is prepared using the formulation and method described in Table 1, except glycerine replaces the diethanolamine on an equivalent-for-equivalent basis. No other flame retarding agent is used in Comparative Sample L. In Comparative Sample M, the amount of glycerine is increased by one part by weight (an additional 0.317 equivalent of glycerine per equivalent of polyols and glycerine in Comparative Sample L). The burn properties of both foams are evaluated according to the MVSS-302 test. Both specimens badly fail the test.

EXAMPLE 4

Flame retarding additive A is prepared by reacting, at room temperature and in the absence of a catalyst, isophorone diisocyanate (IPDI) with sufficient glycerine to yield a mixture containing 50% glycerine and 50% of the dicarbamate of IPDI and glycerine. Flame retarding additive B is prepared by reacting IPDI in a similar manner with sufficient 1,4-butane diol to yield a mixture containing 50% 1,4-butane diol and 50% of the dicarbamate of 1,4-butane diol and IPDI. Molded foam Sample No. 13 is prepared using the formulation and methods described in Example 1, using 2 parts of flame retarding additive A. This amount corresponds to about 0.086 equivalent of the dicarbamate of IPDI and glycerine and 0.305 equivalent of excess glycerine per equivalent of polyol and diethanolamine in the formulation. Molded foam Sample No. 14 is similarly prepared using 3 parts of Flame Retarding additive B in place of the Flame Retarding Additive A. The amount corresponds to 0.071 equivalent of the dicarbamate of IPDI and 1,4-butane diol and 0.317 equivalent of excess butane diol. The physical and burn properties of these foams are as reported in Table 7.

TABLE 7

| Sample No. | 13 | 14 |
|---|---|---|
| Density lb/ft[3] | 1.95 | 1.85 |
| Tensile Strength, psi[1] | 22.5 | 22 |
| Elongation, %[1] | 110 | 127 |
| Tear Strength, pli[2] | 1.16 | 1.42 |
| Resiliency[3] | 58 | 51 |
| HACS[4] | 41.5 | 53.7 |
| ILD[5] | | |
| 25% | 24 | 21 |

TABLE 7-continued

| Sample No. | 13 | 14 |
|---|---|---|
| 65% | 71 | 66 |
| Modulus[5] | 2.96 | 3.14 |
| Air Flow[6] | 1.9 | 0.9 |
| MVSS-302 | | |
| Burn Length, in | 0.0 | 0.025 |
| 0/0 Burns | 4/4 | 3/4 |

[1]ASTM 3574-81 Test E
[2]ASTM 3574-81 Test F
[3]ASTM 3574-81 Test H
[4]ASTM 3574-81 Test D
[5]ILD = Indentation Load Deflection. ASTM 3574-81 Test B Modulus is the ratio of 65% ILD to 25% ILD.
[6]ASTM 3574-81

What is claimed is:

1. An active hydrogen-containing composition suitable for the production of flexible polyurethane foam when reacted with a polyisocyanate, said composition comprising,
   (a) a polyol having an average functionality of about 2.0 to about 4.0, having at least about 50% of its active hydroxyl groups in the form of primary hydroxyl groups, and an equivalent weight from about 500 to about 5000;
   (b) from about 0.5 to about 5 parts, per 100 parts by weight of component (a) of a crosslinker selected from the group consisting of monoethanolamine, diethanolamine, triethanolamine, monoisopropanolamine, diisopropanolamine, methylene bis(o-chloroaniline) and mixtures thereof; and
   (c) at least about 0.15 equivalent per equivalent of (a) and (b), of a polyfunctional flame retarding additive having an equivalent weight of less than about 300, which flame retarding additive is selected from the group consisting of (i) hydroxyl-terminated alkanes having a plurality of primary hydroxyl groups, (ii) alkylene ethers and polyethers having a plurality of primary hydroxyl groups, (iii) polyurea compounds having at least 2 hydroxyalkyl groups which are attached to a urea nitrogen atom, (iv) polycarbamates having a plurality of primary hydroxyl groups or a plurality of primary or secondary hydroxyl-containing hydroxyalkyl groups attached to a tertiary nitrogen atom.

2. The composition of claim 1 wherein about 0.3 to about 1.0 equivalent of said flame retarding additive is present per equivalent of components (a) and (b).

3. The composition of claim 2 wherein component (c) comprises a primary hydroxyl-terminated alkane.

4. The composition of claim 3 wherein component (c) comprises an $\alpha,\omega$-alkylene glycol or glycerine.

5. The composition of claim 4 wherein component (b) comprises diethanolamine.

6. The composition of claim 5 further comprising a blowing agent, a catalyst for the reaction of the polyol with said polyisocyanate, and a silicone surfactant.

7. The composition of claim 6 containing about 1.0 to about 2.5 parts of component (b) per 100 parts by weight component (a), and about 1 to about 6 parts by weight of component (c) per 100 parts component (a).

8. The composition of claim 7 wherein component (a) comprises a polyether polyol or mixture thereof having an average equivalent weight of about 1000 to about 2000.

9. The composition of claim 8 wherein a portion of component (a) comprises a polymer polyol.

10. The composition of claim 8 wherein component (c) is glycerine.

11. The composition of claim 2 wherein component (c) comprises an adduct of a diisocyanate and a mono- or dialkanol amine.

12. The composition of claim 11 wherein component (b) comprises diethanolamine.

13. The composition of claim 12 further comprising a blowing agent, a catalyst for the reaction of the polyol with said polyisocyanate, and a silicone surfactant.

14. The composition of claim 13 containing about 1.0 to about 2.5 parts of component (b) per 100 parts by weight component (a), and about 4 to about 12 parts by weight of component (c) per 100 parts component (a).

15. The composition of claim 14 wherein component (a) comprises a polyether polyol or mixture thereof having an average equivalent weight of about 1000 to about 2000.

16. The composition of claim 15 wherein a portion of component (a) comprises a polymer polyol.

17. The composition of claim 15 wherein component (c) contains a plurality of primary hydroxyl groups.

18. The composition of claim 17 wherein component (c) comprises a reaction product of a diisocyanate with 2-amino-2-methylpropanol or 2-amino-2-methylol-1-butanol.

19. The composition of claim 2 wherein component (c) comprises an alkylene ether or polyether having a plurality of primary hydroxyl groups.

20. The composition of claim 19 wherein component (b) comprises diethanolamine.

21. The composition of claim 20 further comprising a blowing agent, a catalyst for the reaction of the polyol with said polyisocyanate, and a silicone surfactant.

22. The composition of claim 21 containing about 1.0 to about 2.5 parts of component (b) per 100 parts by weight component (a), and about 1 to about 6 parts by weight of component (c) per 100 parts component (a).

23. The composition of claim 22 wherein component (a) comprises a polyether polyol or mixture thereof having an average equivalent weight of about 1000 to about 2000.

24. The composition of claim 23 wherein a portion of component (a) comprises a polymer polyol.

25. The composition of claim 23 wherein component (c) comprises diethylene glycol or triethylene glycol.

26. The composition of claim 2 wherein component (c) comprises a polycarbamate having a plurality of primary hydroxyl groups or a plurality of primary or secondary hydroxyl-containing hydoxyalkyl groups attached to a tertiary nitrogen atom.

27. The composition of claim 26 wherein component (b) comprises diethanolamine.

28. The composition of claim 27 further comprising a blowing agent, a catalyst for the reaction of the polyol with said polyisocyanate, and a silicone surfactant.

29. The composition of claim 28 containing about 1.0 to about 2.5 parts of component (b) per 100 parts by weight component (a), and about 4 to about 12 parts by weight of component (c) per 100 parts component (a).

30. The composition of claim 29 wherein component (a) comprises a polyether polyol or mixture thereof having an average equivalent weight of about 1000 to about 2000.

31. The composition of claim 30 wherein a portion of component (a) comprises a polymer polyol.

32. The composition of claim 30 wherein component (c) comprises the reaction product of a diisocyanate and glycerine or an $\alpha,\omega$-alkylene glycol.

33. A polyurethane foam prepared in the reaction of a polyisocyanate with the composition of claim 1, 9, 17, 24, or 30.

34. The foam of claim 33 which is a molded foam.

35. The foam of claim 33 which is a slabstock foam.

36. The foam of claim 33 having a density from about 1 to about 3.5 pounds per cubic foot.

* * * * *